United States Patent Office 3,682,589
Patented Aug. 8, 1972

3,682,589
SORBATE EXTRACTION OF METALLIC VALUES FROM AQUEOUS LEACH SOLUTIONS
Raymond H. Moore, Kennewick, Wash., assignor to The Bunker Hill Company, Kellogg, Idaho
No Drawing. Filed Nov. 10, 1969, Ser. No. 875,584
Int. Cl. C01g 9/06
U.S. Cl. 423—24                                                                     3 Claims

ABSTRACT OF THE DISCLOSURE

A process for removing metallic impurities such as copper, cobalt, nickel and iron from a clarified leach zinc sulfate solution in the preparation of a zinc sulfate electrolyte for the electrolytic recovery of zinc and the selective recovery of the removed metallic impurities. A selective organic ion exchange extractant is sorbed onto a bed of activated carbon to form a sorbate bed that is selective to one or more of the metallic impurities from the solution and onto the sorbate. The metallic impurities are recovered from the sorbate bed with an appropriate eluate.

BACKGROUND OF THE INVENTION

This invention relates to the process for sorbate extraction of selected metallic values from aqueous leach solutions and more particularly to processes for removing copper, cobalt, nickel and iron from aqueous leach solutions utilizing selective organic reagents sorbed onto activated carbon to purify the leach solution and recover the copper, cobalt, nickel and iron.

In the production of electrolytic zinc from zinc ore concentrate, the zinc ore concentrates are generally roasted to form zinc calcine with a subsequent sulfuric acid leach to dissolve the zinc values.

During the leaching step, a host of soluble metallic impurities are dissolved in the leach solution. Generally the metallic impurities include various concentrations of iron, copper, cobalt, arsenic, cadmium, nickel and antimony. One of the basic problems is to separate the zinc from the other metallic elements to form a zinc electrolyte that is nontoxic and to subsequently separate and recover the metallic impurities. Frequently, manganese dioxide is added to the solution to oxidize ferrous iron to ferric iron. Upon neutralization most of the ferric iron will be removed by precipitation. The leached calcine solution is then passed through a clarification system to separate the iron precipitate and other insoluble residues such as lead, silica and gypsum from the filtrate. The clarified solution is then purified by removing the cadmium, copper, cobalt, nickel and antimony before the zinc sulphate solution is utilized as an electrolyte in the electrolytic cell.

A standard method of purifying the clarified solution is to add varying amounts of zinc dust to precipitate substantial amounts of copper, cobalt, nickel and antimony. Purification by zinc dust is generally carried out in one or more steps depending upon the amounts and kind of impurities present and the grade of the zinc desired. Sometimes small amounts of copper sulphates are added to encourage the precipitation of cobalt.

Purification by zinc dust forms a "neutral solution" which may be sufficiently low in impurities to be used as an electrolyte without further purification. Sometimes further finishing purification steps are required. The techniques involved become quite complicated and are difficult to adapt to varying conditions of concentration of impurities.

Considerable capital investment is required to construct equipment that is necessary to perform the standard purification processes. Frequently the process is quite slow requiring considerable filtering time to separate the precipitate from the filtrate.

Often the metallic impurities have sufficient value to be further processed for their recovery. This generally requires additional separation processes and refining.

One of the principal objects of this invention is to provide a more efficient process for recovering metallic values and purifying concentrated zinc sulphate solutions.

An additional object of this invention is to provide such a process that requires considerably less capital investment for removing many of the impurities from leach solutions in the preparation of a zinc sulfate electrolyte for recovering electrolytic zinc.

A further object of this invention is to utilize organic extractants for removing impurities and the subsequent recovery of the impurities unaccompanied by the usual problems of phase separation required in normal ion extraction processes.

U.S. Letters Patent 3,320,033 issued May 16, 1967, describes a process for recovering uranium and molybdenum value from a leach liquor. Broadly, the patent describes the initial formation of an absorbent that is selective to the desired metallic values by absorbing an organic reagent that is selective to the desired metallic values onto a solid water-insoluble substrate having a hydrophobic surface. Subsequently the raw leach liquor is contacted with the absorbent to extract the desired metallic values. Examples of suitable solid, water insoluble substrates having hydrophobic surfaces include elemental sulfur, synthetic organic polymers and other material such as bentonite and activated carbon that have been treated with hydrophobic compounds such as organosilicones to render their surfaces hydrophobic. Various organophosphorus and organic amine solvent extractants are suggested for absorbing onto the hydrophobic substrate for extracting uranium and molybdenum from lignite leach liquor.

An article entitled "The Development and Properties of an Adsorbent for Uranium" by Messrs. McClaine, Noble, Jr., and Bullwinkel appearing in the March 1958 issue of J. Phys. Chem. 62, pp. 299–303, describes the preparation and properties of an absorbent developed specifically for recovering uranium from sulfuric acid solutions. The absorbent was prepared by absorbing selected organophosphorus compounds onto porous char.

Although it is generaly conceded that the broad concept of recovering dissolved metallic values from an aqueous leach solution by contacting the solution with an absorbent formed by absorbing an organic reagent onto a selected solid substrate is old, there is no suggestion in the prior art of removing undesirable metallic values such as copper, cobalt, nickel and iron from a zinc sulfate leach solution, utilizing a sorbate formed by sorbing certain organic reagents upon activated carbon to purify the leach solution and the subsequent recovery of the metallic values.

It is an additional object of this invention to provide specific sorbates for efficiently and selectively recovering copper, cobalt and nickel from aqueous leach solutions.

A further object of this invention is to provide an efficient process for selectively and separately recovering copper, cobalt and nickel from a sorbate bed.

DETAILED DESCRIPTION OF INVENTION

The foregoing objects are accomplished by providing a process by sorbing an organic extractant, onto granules of activated carbon to form an ion exchange sorbate that is selective to the desired metallic impurity and then subsequently contacting said sorbate with the zinc sulphate solution to extract the desired metallic impurity from the solution and onto the sorbate. The sorbate and the solution are then separated to form a solution that is purified by depleting the desired metallic impurity. The metallic impurity may be recovered from the sorbate by eluting the sorbate with a solvent to dissolve the metallic values into the eluant. This provides for the recovery of the metallic impurity and the regeneration of the sorbate. It has been found that many organic extractants that may normally be highly selective to a particular metallic value are not necessarily suitable for recovering such a metallic value to purify a saturated zinc sulphate solution such as a clarified leach solution or "neutral" solution in electrolytic zinc plant operation. The organic extractant must sorb onto activated carbon in such a manner that the reactive function group of the extractant remains available for ion exchange with the metallic impurity. The extractant must not react with the zinc or sulfate ions at a pH of 6 or lower. Furthermore, the extraction reaction must be reversible under the conditions which are practical utilizing an inexpensive solvent or eluant. The reagent or extractant must be stable in zinc sulphate solution and in suitable eluting solvents. It must be moderately stable in heat, light and air. Furthermore, the extractant must form insoluble complexes with the metallic values in the zinc sulphate solution. Of utmost importance is the requirement that the organic extractant must be non-toxic to the electroyltic deposition of zinc.

As an initial step of this process the organic ion exchange extractant is sorbed onto activated carbon. Through experimentation it was found that activated carbon sold by the Calgon Corporation of the United States under the trademark "Filtrasorb-300" is particularly effective.

Whether the organic ion exchange extractant is absorbed or adsorbed onto the activated carbon granules is difficult to determine. There is some evidence that the reaction may be a combination of both absorption and adsorption. On activated carbon or charcoal it has been practically impossible to distinguish the effects of adsorption and absorption and hence the use of the word "sorption" is utilized to describe the adherence of the extractant to the activated carbon. The term "sorbate" is utilized to describe the product of the sorption process. It appears that the active carbon bed acquires the chemical properties of the sorbate extractant but retains the hydraulic characteristics of the granular activated carbon.

The sorbate formation step was accomplished as follows: 30 grams of active carbon was placed in a tube, and then wetted with water and loaded to saturation with the extractant by passing a liter of the extractant dissolved in a 15 volume percent ethanol-water mixture. The sorbate bed was 40 centimeters in length with the cross section of 1.25 square centimeters and had a volume of 50 cubic centimeters.

Following the preparation of the sorbate bed, the bed was heated to approximately 50 degrees C. with an external water jacket. The sulphate solution was passed through the sorbate bed to contact the solution with the sorbate to extract metallic impurities from the solution.

The effluent from the bed was analyzed to determine the amount of impurities remaining in the solution in comparison to the infeed. The performance of the sorbate was arbitrarily calculated in relation to the number of bed volumes of solution passed through the bed before the amount of impurities in the effluent equaled 50% of the feed concentration.

The metallic impurities were recovered from the sorbate by eluting the metallic values with a suitable solvent. Frequently the bed was washed with water prior to eluting.

Copper

It has been found that the organic extractants of salicylaldoxime and benzoylacetone can be effectively sorbed onto activated carbon and utilized in efficiently removing copper from sulfate solutions generally and concentrated zinc sulphate solutions particularly.

A test solution of copper sulphate having 2.0 grams per liter of copper was prepared and adjusted to a pH of 4.0 and was fed to a prepared salicylaldoxime sorbate bed at an average flow rate of 2.0 ml. per minute. Fractions of the effluent from the bed were collected and analyzed for copper. It was found that a salicylaldoxime sorbate bed effectively removed the copper from the solution. It was not until 10.1 bed volumes of solution were passed through the bed that the copper concentration of the effluent approached 50% of the feed concentration. The bed was then eluted with an acid solution of 3 M $H_2SO_4$. The bed was then washed with water to remove excess acid.

In a subsequent test, a clarified zinc plant leach solution having in excess of 150 grams per liter of zinc and containing 0.46 grams per liter of copper was fed through the salicylaldoxime sorbate bed. It was found that the sorbate removed the copper without the zinc until the sorbate was effectively saturated. The effluent leaving the bed did not reach a copper concentration of 50% of the feed until 35 bed volumes of fluid were passed through the bed.

In a subsequent test, a larger salicylaldoxime carbon sorbate bed was prepared having a bed volume of 300 ml. A total of 6825 ml. of clarified zinc plant leach solution passed through the bed. This is an equivalent of 22.7 bed volumes. There was no breakthrough of copper evident in the effluent.

The copper from a salicylaldoxime sorbate can be readily eluated with sulfuric acid.

A test solution of copper sulphate having 2.0 grams per liter was passed through a benzoylactone sorbate bed. It was found that benzoylacetone did not react quite as fast as salicylaldoxime but that it had about the same capacity for extracting copper. About 10 bed volumes of solution were passed through the bed before the effluent showed a copper concentration of 50% of the feed. A clarified zinc plant leach solution of approximately 0.5 grams per liter of copper was passed through a benzoylacetone sorbate bed with no noticeable copper in the effluent after 10 bed volumes. Copper values may be efficiently eluated from the benzoylacetone sorbate with 1.0 to 2.0 M $H_2SO_4$.

Nickel

It has been found that organic ion exchange extracts— salicylaldoxime and dimethylglyoxime—can be effectively sorbed onto activated carbon for extracting nickel from sulfate solutions generally and zinc electrolytic solutions particularly.

In one test a 50 cm.$^3$ bed of salicylaldoxime sorbate was prepared for receiving a zinc sulphate "neutral solution" having 0.2 gram per liter of nickel. It was not until over 13.5 bed volumes of the solution were passed through the bed that the effluent registered a nickel concentration of 50% of the feed. After eluting the nickel from the salicylaldoxime sorbate bed, a second "neutral" zinc sulfate solution having a concentration of 0.05 gram per liter of nickel was passed through the bed. Twenty-seven bed volumes of solution flowed through the bed without any nickel being detected in the effluent.

In a second test, a sorbate bed was formed with dimethylglyoxime for extracting nickel from a zinc sulphate "neutral solution" having a nickel concentration of 20 mg. per liter of nickel. No nickel was detected in effluent fractions removed from the bed. The nickel was recovered from the dimethylglyoxime sorbate by eluting the bed with 1 M $H_2SO_4$.

Cobalt

It has been found that salicylaldoxime forms an effective sorbate for extracting cobalt from sulfate solutions generally and clarified zinc plants solutions particularly. In one test a salicylaldoxime sorbate bed was prepared for receiving a zinc sulfate "neutral solution" having 0.2 gram per liter of cobalt. The effluent fractions showed a cobalt concentration of 50% of the feed at 3 bed volumes. It was found that for sulfate solutions containing copper, nickel and cobalt, the salicylaldoxime sorbate would preferentially extract the copper, then nickel and then cobalt. Thus, if the sorbate is not saturated with copper, nickel and cobalt can also be removed at the same time.

Iron

It has been found that benzoylacetone and phenylbenzohydroxamic acid make effective organic ion exchange extractants for sorbing onto activated carbon for extracting iron from saturated zinc sulphate solutions. It was found that benzoylacetone is effective in removing ferric iron from zinc sulphate solutions as well as removing both copper and ferric iron together. A saturated clarified zinc plant leach solution was passed through a bed of benzoylacetone sorbate having a trace of ferric iron. The ferric iron was effectively removed from the solution along with the copper. The iron and copper were effectively eluted from the sorbate with 1 to 2 M $H_2SO_4$. The phenylbenzohydroxamic acid sorbate was effective in extracting both the ferrous and ferric irons from the concentrated zinc sulphate solution.

Selective recovery

It was found that copper, cobalt and nickel can be selectively recovered from a salicylaldoxime sorbate by varying the pH of the eluant. The nickel and cobalt can be removed from the sorbate while leaving the copper by eluting the salicylaldoxime sorbate with a sulfuric acid solution of 0.5–0.1 M. After the nickel and cobalt are removed, the copper can be removed by eluting the salicylaldoxime sorbate with a sulfuric acid solution of approximately 2 M.

The above examples illustrate that the invention provides a method for purifying and recovering metallic values from zinc sulfate solutions and more particularly to removing metallic impurities from clarified zinc sulfate leach solutions in the formation of zinc sulfate electrolyte for subsequent recovery of zinc.

It should be appreciated that the process is simple, economically feasible and highly dependable. The process eliminates complicated and expensive procedures and equipment. The process may be utilized for the removal of impurities from the clarified leach solution or the process can be utilized as a final polishing (purification) step before the zinc sulfate solution goes to the electrolytic cells.

What is claimed is:

1. A purification process for removing one or more metallic impurities from a clarified zinc sulfate leach solution to form a zinc sulfate electrolyte in which the metallic impurities are selected from a group consisting of copper, cobalt and nickel, comprising the steps of:
   (a) sorbing an aqueous insoluble organic extractant of salicylaldoxime onto a surface of activated carbon to form an extractant sorbate that is selective to said selected metallic impurity; and
   (b) subsequently contacting the extractant sorbate with the clarified zinc sulfate leach solution to extract said metallic impurity from the solution and onto the surface of the sorbate.

2. The purification process as defined in claim 1 further comprising the step of separating the pregnant sorbate and the aqueous solution.

3. The purification process as defined in claim 2 further comprising the step of eluting the metallic impurity from the separated sorbate with an aqueous acid solution having a molarity of greater than 0.5.

References Cited

UNITED STATES PATENTS

| | | | |
|---|---|---|---|
| 1,854,787 | 4/1932 | Dutoit | 23—125 |
| 3,320,033 | 5/1967 | Goren | 252—259.5 X |
| 1,778,987 | 10/1930 | Stevens et al. | 23—125 |
| 3,088,798 | 5/1963 | Fetscher | 23—125 X |

OTHER REFERENCES

"Separation of Heavy Metals" by A. K. De, 1961 Ed., pp. 35 and 36. Pergamon Press, New York.

EDWARD STERN, Primary Examiner

U.S. Cl. X.R.

23—312; 75—101 BE; 204—114, 119